United States Patent [19]

Houseman

[11] Patent Number: 4,664,390
[45] Date of Patent: May 12, 1987

[54] WEATHER SEAL DEVICE FOR CONDUIT EXTENDING THROUGH RIDGED SURFACE

[75] Inventor: David G. Houseman, Richmond, Australia

[73] Assignee: John Deks Australia Pty. Ltd., Bayswater, Australia

[21] Appl. No.: 723,035

[22] Filed: Apr. 15, 1985

[51] Int. Cl.4 .................. F16J 15/02; E04D 13/14
[52] U.S. Cl. .................. 277/12; 277/212 FB; 52/58; 285/42
[58] Field of Search ............ 277/9, 12, 32, 213, 277/169, 212 FB; 285/3, 4, 42–44; 52/58–60, 199

[56] References Cited

U.S. PATENT DOCUMENTS

| | | | |
|---|---|---|---|
| 1,544,761 | 7/1925 | Kiefer | 285/42 |
| 1,683,548 | 9/1928 | Hughey | 285/43 |
| 1,710,304 | 4/1929 | Flynn et al. | 285/42 |
| 4,120,129 | 10/1978 | Nagler et al. | 285/44 X |
| 4,211,423 | 7/1980 | Resech | 277/12 X |
| 4,333,660 | 6/1982 | Cupit | 285/42 X |

FOREIGN PATENT DOCUMENTS

| | | | |
|---|---|---|---|
| 2360538 | 6/1975 | Fed. Rep. of Germany | 285/44 |
| 2523575 | 12/1975 | Fed. Rep. of Germany | 285/43 |
| 2951275 | 7/1981 | Fed. Rep. of Germany | 52/58 |
| 627271 | 6/1927 | France | 285/43 |
| 1287555 | 2/1962 | France | 52/58 |

*Primary Examiner*—Robert S. Ward
*Attorney, Agent, or Firm*—Laughlin, Markesohn Lagani & Pegg

[57] ABSTRACT

A weather seal device for providing a seal between a surface having longitudinal ridges and/or valleys and an elongate conduit extending therethrough, the device having an apertured base of resilient deformable material and a sleeve of resilient material integral with the base and projecting from one side. The base in use is superimposed on the surface and the elongated conduit extends through the aperture and through the sleeve. The base has a marginal edge portion to be positioned in use so that it extends in a direction inclined in the direction of the longitudinal ridges and/or valleys. The marginal edge portion is contoured along its length in a direction normal to the plane of the base, so that in a free state the length of the marginal edge portion measured along the contours is greater than the linear length.

15 Claims, 4 Drawing Figures

U.S. Patent  May 12, 1987  4,664,390
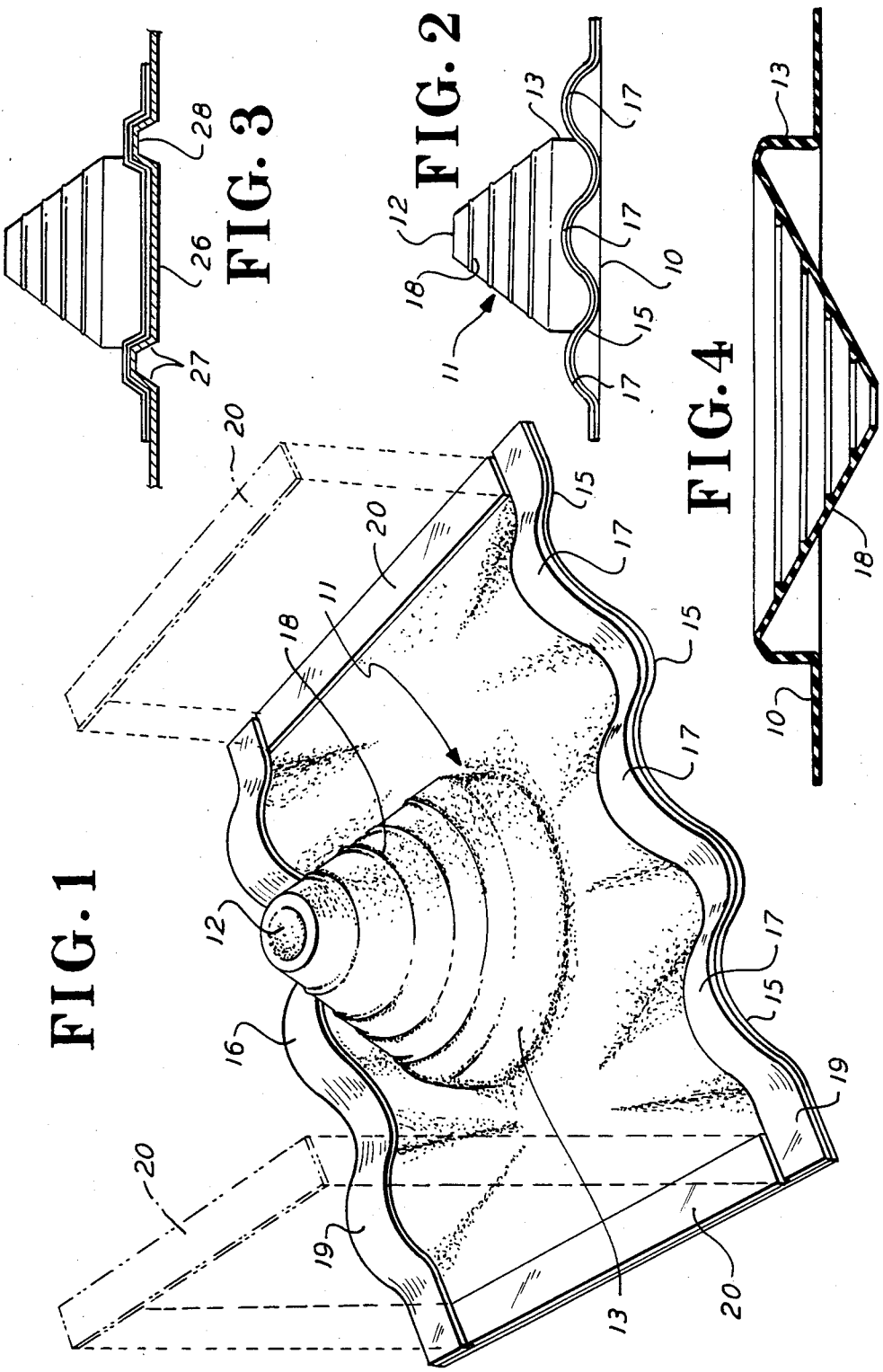

WEATHER SEAL DEVICE FOR CONDUIT EXTENDING THROUGH RIDGED SURFACE

This invention relates to an improved seal device for providing a weather seal between an elongate member and a non-planar surface such as a roof or wall of a building or like structure.

BACKGROUND OF THE PRIOR ART

There are currently in use in Australia seal devices for this purpose comprising an apertured base member including a non-metallic apertured flange element of resilient material bonded in face-to-face relation to a continuous peripheral metallic flange, and a sleeve member of resilient material integral with the base member and which extends outwardly therefrom to receive the elongate member. The base member is in use secured to the non-planar surface, and is of a non-resilient manually deformable nature so that, in use, it may be deformed to conform to the contour of the non-planar surface and will substantially retain such deformed contour. The sleeve member has an end remote from the base member which is adapted to receive said elongate member in sealing engagement therewith when the seal device is in use. The sleeve member, between the said remote end thereof and the base member, is sufficiently flexible to accommodate in use misalignment between the base member and the remote end of the sleeve, that may arise during installation or during the service life of the seal device.

The seal device above referred to is described in more detail in U.S. Pat. No. 4,333,660 in the name of G. M. Cupit. This seal device is very effective when used for pipes or ducts of a size up to about 400 mm diameter or similarly sized rectangular. However in many applications, as encountered in industrial and commercial building, it is required to seal about large pipes or ducts, as used in ventilation and air conditioning systems, frequently of diameters of 600 mm and above.

When sealing around ducts of this order of size the number of ridges or valleys over which the base member of the seal device may extend is increased. This requires a corresponding increase in the length of material required in the base member edge area to accommodate the degree of contouring necessary for the base member to follow the ridges and valleys. Also the increased degree of contouring in the edge area of the base member produces an increased degree of distortion over the general area of the base flange, and this distortion may extend into the sleeve member itself.

If we consider the prior proposed seal device in a large size, and having a flat rectangular shaped base flange, with a continuous one piece deformable metal strip along the complete marginal edge, the following problems arise in use. When the two opposite edge portions of the base member, which extend transversely across the ribs and valleys of the sheet, are contoured to follow the profile of a roof sheet, the length of these two edge portions is shortened. Consequently the two longitudinally disposed edge portions of the base member are required to move towards one another, as they are rigid at their ends with the ends of the two transverse contoured edge portions. However as the centrally located sleeve member is relatively stiff compared to the flange, the majority of the inward movement is accommodated in distortion of the area of the base flange on either side of the sleeve member.

This can result in folds and pockets in the base flange extending between the ridges of the roof sheet, which functions as a dam to water flow. This damming of the water flow is not acceptable as it aggravates leakage problems, especially in so-called flat and low pitched roofs.

If the sleeve member is made more resilient, so that it may deflect to absorb part of an inward movement of the longitudinal edges, this reduces the maximum size the of duct that may pass through the sleeve member.

Further with the one piece metal strip about the edge portion of the base member, the position of the two side portions of the strip is determined solely by the degree of shortening of the transverse portions of the strip subjected to the contouring. This can result in the side portions being positioned where it is inconvenient or difficult to secure them in sealed contact with the roof sheet. Such a location may be on a fold in the roof sheet, or on a vertical or near vertical side of a ridge or valley.

Similar problems exist if the seal device of the prior art has a circular flange with a continuous metal strip secured thereto along the perimetal marginal portion. The greater the amount of contouring of the strip required to accommodate the ridges and valleys of the roof sheet, the greater is the reduction of the diameter of strip and the degree of folding required of the flange inwardly of the perimetal strip.

SUMMARY OF THE INVENTION

It is therefore the object of the present invention to provide an improvement in the weather seal device which is effective in operation, convenient to install on a wide range of surface contours and elongate member cross-sections, and reduces or overcomes the problems above discussed.

With this object in view there is provided a weather seal device including a marginal edge portion comprising a deformable non-resilient flange element, and a resilient flange element attached thereto, each contoured so that the length of said edge portion measured along the contour is greater than the linear length thereof. These measurements are made when the edge portion is in the free as produced state and supported on a substantially flat surface.

Preferably the base member is moulded to the required contour during curing of the resilient material. The contouring may extend inwardly from the marginal portion and progressively decrease in height to blend smoothly into the base member at locations inwardly from the edge thereof.

It is to be understood that the contour provided in the marginal portion of the base member is not intended to correspond closely to the contour of the ridges and valleys on the surface to which the seal device is to be fitted. The contouring of the marginal portion provides additional material that may be reshaped to complement the configuration of the surface, without excessive distortion of the portion of the base member located between the marginal portion and the sleeve member and/or the sleeve member itself.

The reduction or elimination of distortion of the base member and sleeve, resulting from the additional length available in the marginal portion for conforming the base member with the surface to which the seal device is to be fitted, is important to ensure that water flow freely around the sleeve member and is not trapped in or behind folds or pockets formed in the base member. Also distortion of the sleeve member, which may reduce the effective diameter thereof and so reduce the maximum size elongate member that may be passed therethrough, can be reduced or eliminated.

Conveniently a strip of non-resilient manually deformable material is secured to the marginal edge portion of the base member along substantially the length thereof and follows the contour thereof. The strip and the marginal edge portion of the base member secured thereto may thus be non-resiliently deformed to complement the contour of the surface to which it is to be fitted. Also when in use the marginal edge portion may be pressed between the strip and the surface to provide a weathertight seal therebetween.

Preferably the contouring of the strip and the marginal portion of the resilient base member is in the form of a series of corrugations generally transverse to the direction of the length of the strip. The corrugations may be of an arcuate form or channel form or any other convenient contour.

The non-resilient deformable strip may conveniently be made of any appropirate material such as one of the soft matals particularly aluminium or aluminium alloy. Also preformed holes may be provided in the strip to provide a guide for drilling holes through the base member and through the sheet of material to which the sealing device is fitted during assembly. Suitable fastenings may be subsequently inserted through the holes.

In a preferred form the base member is of a generally rectangular outline with the sleeve projecting generally centrally therefrom. The strips of non-resilient deformable material are placed along two opposite parallel edges of the rectangular base member. Further strips of non-resilient deformable material may be provided along the other two edges of the flange, these strips not being rigidly connected to the strips to which the contours are applied.

In one preferred form the uncontoured strips are produced as a separate item to be assembled to the base member during installation, this construction permits the operator to select the most desirable location to place the strips in each particular installation, having regard to the longitudinal ridges and valleys on the sheet to which the seal device is being fitted. In this latter form the strips may be provided with a suitable contact adhesive on one surface, so that they may be bonded to the resilient flange by the operator at the selected location. Again the strips may be provided with preformed holes to receive fastening devices during installation.

The concept of having strips bonded to the transverse edge of the base member, so as to in installation lie across the valleys and ridges, and to have non-detached strips for fit to the longitudinal edges of the base member to extend in the direction of the valleys and ridges during installation, has advantages irrespective of whether the strips bonded to the flange are contoured or straight.

Accordingly, in one modified form of the invention the seal device has a base member comprising a flange of resilient flexible material to which the sleeve member is integrally formed, and has two strips of non-resilient deformable material extending along two opposite edges of the flange and bonded thereto in face-to-face relation, and two unattached strips of non-resilient deformable material are provided which may, during installation be fitted to the flange along the other two opposite edges.

BRIEF DESCRIPTION OF THE DRAWINGS

FIG. 1 is a perspective view of a seal device in accordance with the invention.

FIG. 2 is a side view of the seal device shown in FIG. 1 fitted to a surface shown in cross section having longitudinal ridges.

FIG. 3 is a side view of the seal device shown in FIG. 1 fitted to a surface shown in cross section having longitudinal ridges of a second configuration.

FIG. 4 is a transverse sectional view of a method of molding the seal device shown in FIG. 1.

DETAILED DESCRIPTION OF THE INVENTION

The seal device comprises a flange 10 of resilient readily deformable material, such as natural or synthetic rubber, having an integral sleeve 11 extending from the upper face of the flange. The sleeve 11 has a tapered portion 18 tapering toward the upper free end 12, and at the lower end has a generally cylindrical portion 13 that connects the tapered portion 18 to the flange 10. The wall of the cylindrical portion 13 is preferably somewhat thicker than the adjacent portion of the flange 10 and tapered portion 18 to provide greater resistance to distortion in use. The junction areas between the cylindrical portion 13 and the flange 10 and tapered portion 18 are sufficiently flexible to accommodate misalignment of the cylindrical portion relative to the other parts of the seal device, as may be necessary to normal use.

Spaced along the tapered portion 18 are a plurality of external ridges 14 denoting where the sleeve may be cut off to suit elongate members of different diameters. The ridges also provide a reinforcement about the edge of the open end of the sleeve so formed.

The flange 10 is of generally rectangular shape with the sleeve 11 disposed generally central thereof. In use the two opposite edges 15 and 16 of the flange are intended to be disposed across the direction of ridges and or valleys in the surface to which the seal device is to be fitted. Along each of the edges 15 and 16 the flange is provided with a number of contoured portions 17 which are displaced from the normal flat plane of the flange. In the example shown these contoured portions are generally arcuate, but may be of other shapes. The contoured portions 17 are of a maximum height at the edge of the flange and over the inner portion decrease in height to blend smoothly into the flat portion of the flange inwardly from the edge.

Along each edge 15 and 16 of the flange 10 there is provided a strip 19 of non-resilient deformable material such as aluminium or the like. Each strips are contoured to the same shape as the contoured edge portion of the flange, and is bonded or otherwise secured thereto in face to face relation. Conveniently the strips 15 and 16 may be bonded to the flanges during curing of the flange in a heated mould. Separate strips 20 may be provided to extend along the other edges of the flange 10. The strips 20 are independent of the strips 15 and 16 and are preferably spaced a short distance therefrom at the ends. This provides more freedom of movement of the flange material to avoid excessive folding in the area adjacent the sleeve. Also as previously stated it enables the operator some discretion in selecting where the side edges of the flange is to be fastened to the roof sheet.

It is preferable for the strips 20 to be free and not affixed to the flange 10 prior to installation. The side edges of the flange tend to take up a slightly outwardly bowed shape during installation. This would be prevented if the strips were secured to the edge portion, and result in further folding or buckling of the flange inward of the edge. Also a more pleasing appearance is obtained by fitting the free strip in situ during installation so the strip is straight, parallel to the ridges of the roof sheet, and excess flange material outside of the strip may be cut off.

In one form the strips 20 may be coated on one face with a contact adhesive so that they may be applied to the flange at the appropriate location during installation of the seal device.

The preceding description has been specifically directed to providing a weather seal about an elongate member extending in sealing about a member or structure mounted on a roof or wall of a building, or in like situation. Examples of such structures are sky-lights, ventilators, and walls or parapet that adjoin a roof. As such structures usually have a flat surface there remains the problem that the length of the structure to be sealed against is less than that of the non-planar roof or wall. Accordingly, sealing devices for use in these areas also require one edge portion of the resilient sealing material to be moulded to a contour so the length measured along the contour is greater than the linear length of the edge portion. Preferably, as previously described, a strip of non-resilient deformable material, such as a metal strip, is bonded or otherwise secured to the contoured portion and has the same contour. When it is required to seal between a non-planar surface, such as a roof or wall and a flat surface which intersects same, the seal device may be a strip of resilient material contoured as above discussed along at least part of the length of one edge with the opposite edge flat. A metal strip may be provided along the flat edge also.

FIG. 3 of the drawings weather seal device described with reference to FIGS. 1 and 2 fitted to a roof sheet 25. The sheet 25 has longitudinal ridges 26 having flat inclined sides 27 and a flat top 28. The curved or arcuate contoured edge of the flange 10 in FIG. 1 has been re-shaped to conform to the profile of the sheet 25, and this has been achieved without a substantial change in the overall length of the edge portion of the flange.

The extent of the contouring of the edge portion is generally of the order that will reduce the length of the edge by 7 to 12% of the flat length. That is, after contouring the overall length is 93 to 88% of the flat length. In the roofing industry this is generally referred to as 93 to 88% yield. In different countries or locations the profile of normally used roof sheets may vary substantially, and thus the degree of contouring or percentage yield may vary substantially from the above quoted figures. In Australia there is one particular roof sheet which has approximately 25% yield. However, it has been found that one particular contour of the edge portion of the flange will accommodate a range of roof sheets of different yields. One particular contour does cover effectively the above stated range of 93 to 88% yield.

The weather seal device as described, with reference to FIGS. 1 and 2, may be produced as a moulding of rubber or like resilient material. In order to simplify the die for moulding such an article, part of the sleeve member may be formed as a re-enterant section that extends back through the aperture in the base member.

The mode of moulding the seal device is illustrated in the transverse sectional view. FIG. 4, wherein the tapered part 18 is initially moulded so that it extends from the upper end of the cylindrical portion 13 concentrically through the cylindrical portion 13 and the aperture defined by the flange 10, to project below the flange 10. Arranging the moulding of the seal device in this way substantially reduces the overall height of the moulding and consequently the cost of the mould. The height reduction is also convenient for subsequent storage and packaging.

At the time of use, or at a convenient time therefore, the tapered portion 18 may be displaced upwardly to occupy the position shown in FIG. 1, and will naturally retain that position.

I claim:

1. A weather seal device for providing a seal between a surface having longitudinal ridges and an elongate member extending therethrough, said device comprising an apertured base member of resilient deformable material to be located in use in superimposed relation on the surface with the elongate member extending through the aperture, a sleeve member of resilient material integral with the base member and projecting from one side thereof, said sleeve member enclosing said aperture in the base member so that in use the elongate member also extends through the sleeve member, the end of the sleeve member remote from the base member being adapted to in use sealably engage the exterior of the elongate member, said base member having a marginal edge portion extending along one edge of the base member, a marginal portion spaced from the junction of the sleeve member and the base member and to in use be positioned to extend in a direction generally inclined and across the direction of the longitudinal ridges of the surface, said marginal edge portion being contoured along its length in a direction normal to the plane of the base member, so that the length of the marginal edge portion measured along the contours is greater than the linear length thereof, when the measurements are made when the edge portion is in the free as produced state, said base member in the free, as-produced state having a substantially flat area between the contoured marginal edge portion and the junction of the base member and the sleeve member, said contours in the marginal edge portion in use being deformed to follow the contour of the surface having longitudinal ridges with limited alteration of the linear length of the marginal edge.

2. A weather seal device as claimed in claim 1 wherein a strip of non-resilient manually deformable material is secured to said marginal edge portion of the base member along substantially the length thereof and follows the contour thereof, whereby the strip and the marginal edge portion of the base member secured thereto may be non-resilient deformed to complement the contour of the surface to which it is to be fitted and when in use the marginal edge portion may be pressed between the strip and the surface to provide a weathertight seal therebetween.

3. A weather seal device according to claim 2, wherein the base member has two marginal edge portions and said marginal edge portions that extend in a direction transverse to the strips of non-resilient manually deformable material are of resilient deformable material.

4. A weather seal device as claimed in claim 2, wherein the strips are made of aluminium.

5. A weather seal device as claimed in claim 1 wherein two marginal edge portions of the base member are contoured along their length, said marginal edge portions being located on opposite sides of the sleeve member.

6. A weather seal device as claimed in claim 5 having a strip of non-resilient manually deformable material secured to each of said two marginal edge portions.

7. A weather seal device as claimed in claim 1 wherein the contour of the marginal edge portion extends from said portion inwardly of the base member toward the sleeve member.

8. A weather seal device as claimed in claim 7 wherein the height of the contouring above the plane of the base member is progressively decreased from the marginal edge portion inwardly towards the sleeve member.

9. A weather seal device as claimed in claim 1 wherein the sleeve member has a substantially cylindrical lower portion at the lower end and an upwardly tapered upper portion.

10. A weather seal device as claimed in claim 9 wherein the cylindrical lower portion has a wall thickness greater than the thickness of the flange and of the tapered upper portion adjacent the respective ends of the cylindrical portion.

11. A weather seal device as defined in claim 1 wherein a marginal edge portion to be secured in use to a surface having longitudinal ridges, said marginal edge portion being made of a resilient material and contoured along its length in a direction normal to the plane of the edge portion so that in a free state the length of the edge portion measured along the contours is greater than the linear length thereof.

12. A weather seal device as claimed in claim 11 wherein a strip of non-resilient deformable material is secured to said marginal edge portion along substantially the length thereof and follows the contour thereof, whereby the strip and the marginal edge portion secured thereto may be non-resiliently deformed to complement the contour of the surface to which it is to be fitted, and when in use the marginal edge portion may be pressed between the strip and the surface to provide a weathertight seal therebetween.

13. The weather seal device as claimed in claim 1 wherein a portion of the sleeve member remote from the base member is formed concentric with another portion of the sleeve member adjoining the base member.

14. The device according to claim 13 wherein said another portion of the sleeve member is moulded with a thicker wall than the adjoined part of the remote section of the sleeve member.

15. The device according to claim 11 wherein said portion of the sleeve member remote from the base member is tapered towards the remote end of the sleeve member, and as moulded the remote end is below the base member.

* * * * *